US012577418B2

(12) United States Patent
Ogura

(10) Patent No.: US 12,577,418 B2
(45) Date of Patent: Mar. 17, 2026

(54) INK COMPOSITION FOR WATER-BASED BALLPOINT PENS

(71) Applicant: MITSUBISHI PENCIL COMPANY, LIMITED, Shinagawa-ku (JP)

(72) Inventor: Kosuke Ogura, Shinagawa-ku (JP)

(73) Assignee: MITSUBISHI PENCIL COMPANY, LIMITED, Shinagawa-ku (JP)

( * ) Notice: Subject to any disclaimer, the term of this patent is extended or adjusted under 35 U.S.C. 154(b) by 708 days.

(21) Appl. No.: 17/788,406

(22) PCT Filed: Dec. 15, 2020

(86) PCT No.: PCT/JP2020/046737
§ 371 (c)(1),
(2) Date: Jun. 23, 2022

(87) PCT Pub. No.: WO2021/131899
PCT Pub. Date: Jul. 1, 2021

(65) Prior Publication Data
US 2023/0048616 A1 Feb. 16, 2023

(30) Foreign Application Priority Data
Dec. 24, 2019 (JP) ................................. 2019-233245

(51) Int. Cl.
*C09D 11/18* (2006.01)
*C09D 11/037* (2014.01)
*C09D 11/102* (2014.01)
*C09D 11/17* (2014.01)

(52) U.S. Cl.
CPC ............ *C09D 11/18* (2013.01); *C09D 11/037* (2013.01); *C09D 11/102* (2013.01); *C09D 11/17* (2013.01)

(58) Field of Classification Search
CPC ..... C09D 11/18; C09D 11/037; C09D 11/102; C09D 11/17; C09D 11/16
See application file for complete search history.

(56) References Cited

U.S. PATENT DOCUMENTS 6,306,930 B1 10/2001 Tsujio
8,770,735 B2 * 7/2014 Hakiri .................. B41J 2/17503
347/100
8,955,953 B2 * 2/2015 Hakiri .................. C09D 11/324
347/56
2013/0038660 A1 * 2/2013 Hasegawa ............ C09D 11/324
524/386
2013/0147876 A1 6/2013 Hakiri et al.
2017/0015854 A1 * 1/2017 Shimizu .............. C09D 125/08
2019/0010344 A1 * 1/2019 Ichikawa .................. C09C 3/10

FOREIGN PATENT DOCUMENTS

EP 3 211 046 A1 8/2017
EP 2833370 B1 * 11/2024 ............. G01K 11/12
JP 10-60330 A 3/1998
JP 2006-143992 A 6/2006
JP 2007-56217 A 3/2007
JP 2010-150337 A 7/2010
JP 2016-124951 A 7/2016
JP 2017-155161 A 9/2017
JP 2018-188573 A 11/2018
WO WO-2024182514 A1 * 9/2024

OTHER PUBLICATIONS

Machine English translation of Breton Y, EP-2833370-B1, Nov. 27, 2024. (Year: 2025).*
International Search Report issued Feb. 22, 2021 in PCT/JP2020/046737, filed on Dec. 15, 2020, 2 pages.
Extended European Search Report issued Nov. 30, 2023, in corresponding European Patent Application No. 20905578.9, 15 therein, 6 pages.

* cited by examiner

*Primary Examiner* — Coris Fung
*Assistant Examiner* — Caroline D. Liott
(74) *Attorney, Agent, or Firm* — Oblon, McClelland, Maier & Neustadt, L.L.P.

(57) ABSTRACT

An ink composition for a water-based ballpoint pen in which, even in a case of an ink composition for a water-based ballpoint pen using a colored resin particle containing a pigment, the phenomenon of skipped strokes does not occur and writing defects are less likely to occur when writing at a high writing angle or under a high load. An example of the ink composition for a water-based ballpoint pen according to the present embodiment includes an ink composition for a water-based ballpoint pen that contains at least a urethane-based colored resin particle containing a pigment and having an average particle size of 0.3 to 2 μm and a naphthalenesulfonic acid-formaldehyde condensate.

9 Claims, No Drawings

INK COMPOSITION FOR WATER-BASED BALLPOINT PENS

CROSS-REFERENCE TO RELATED APPLICATIONS

The present application is the national stage of international application PCT/JP2020/046737, filed on Dec. 15, 2020, and claims the benefit of the filing date of Japanese Appl. No. 2019-233245, filed on Dec. 24, 2019.

TECHNICAL FIELD

The present specification relates to an ink composition for a water-based ballpoint pen, including a urethane-based colored resin particle containing a pigment.

BACKGROUND ART

As a colorant for an ink for a writing instrument and the like, numerous attempts have been made to use a resin particle containing a pigment. Patent Document 1 discloses a water-based ink composition using a colored resin particle including a microcapsule pigment in which a dye or a pigment is contained within a microcapsule wall membrane.

Such a colored resin particle containing a pigment as described in Patent Document 1 and the like has excellent properties such as being easy to be dispersed and being stable even when different colors are mixed. However, when the colored resin particle containing a pigment described in Patent Document 1 and the like is used as an ink composition for a water-based ballpoint pen, in a case of writing at a high writing angle or under a high load, the colored resin particle containing a pigment may interpose between a ball and a ball socket, hindering the rotation of the ball and causing skipped strokes, which makes phenomena that cause writing defects more likely to occur.

CITATION LIST

Patent Document

Patent Document 1: JP 2010-150337 A (Claims, Examples, etc.)

SUMMARY OF INVENTION

Technical Problem

In light of the issues described above, the present disclosure is intended to solve these issues, and an object of the present disclosure is to provide an ink composition for a water-based ballpoint pen in which, in a case of an ink composition for a water-based ballpoint pen using a colored resin particle containing a pigment, the phenomenon of skipped strokes does not occur and writing defects are less likely to occur even when writing at a high writing angle or under a high load.

Solution to Problem

As a result of dedicated research in light of the issues described above, the present inventors have found that the intended ink composition for a water-based ballpoint pen can be obtained by including at least a specific colored resin particle having an average particle size within a predetermined range and a specific component, and thus completed the present disclosure.

That is, the ink composition for a water-based ballpoint pen of the present disclosure includes at least a urethane-based colored resin particle containing a pigment and having an average particle size of 0.3 to 2 μm and a naphthalenesulfonic acid-formaldehyde condensate. The pigment is preferably carbon black.

The content of the naphthalenesulfonic acid-formaldehyde condensate is preferably 0.05 to 5 mass % relative to the total amount of the ink composition.

Advantageous Effects of Invention

The present disclosure provides an ink composition for a water-based ballpoint pen in which, even in a case of an ink composition for a water-based ballpoint pen using a colored resin particle containing a pigment, the phenomenon of skipped strokes does not occur and writing defects are less likely to occur when writing at a high writing angle or under a high load.

In the present specification, both of general explanation described above and detailed explanation described below are exemplification and explanation and do not limit the present disclosure described in the Claims.

DESCRIPTION OF EMBODIMENTS

At least some embodiments of the present disclosure will be described in detail below. However, note that the technical scope of the present disclosure is not limited to the embodiments described below and includes the invention described in Claims and equivalents thereof. The ink composition for a water-based ballpoint pen of the present disclosure is characterized in that it includes at least a urethane-based colored resin particle and a naphthalenesulfonic acid-formaldehyde condensate, the urethane-based colored resin particle containing a pigment and having an average particle size of 0.3 to 2 μm.

Pigment

A pigment contained in the urethane-based colored resin particle used in the present disclosure is not limited, and any pigment among inorganic and organic pigments commonly used in water-based ink compositions for writing instruments and the like can be used. Examples of the inorganic pigments include carbon black, titanium oxide, zinc oxide, iron oxide, chromium oxide, and ultramarine. Examples of the organic pigments include azo lake, insoluble azo pigments, chelate azo pigments, phthalocyanine pigments, perylene and perinone pigments, anthraquinone pigments, quinacridone pigments, lake dyes, nitro pigments, and nitroso pigments. One type of these may be used alone, or a combination of two or more types of these may be used.

With an ink composition for a water-based ballpoint pen using a colored resin particle containing carbon black, the phenomenon of skipped strokes described above is particularly likely to occur, and the effects of the present disclosure can be exhibited advantageously.

The content of the pigment in the colored resin particle is preferably 5 to 40 mass %, more preferably 10 to 35 mass %, and particularly preferably 12 to 25 mass %.

When the content of the pigment is less than 5 mass %, the coloring strength is insufficient, and visibility of strokes may decrease. Meanwhile, when the content of the pigment is greater than 40 mass %, the amount of the pigment is excessive, and color reproducibility may deteriorate.

3

Urethane-Based Colored Resin Particle

The urethane-based colored resin particle of the present disclosure includes at least a microcapsule pigment containing the pigment described above, and can be produced by, for example, microencapsulating a material containing at least the pigment described above, specifically, encapsulating such a material in a shell layer (shell) including a wall-forming substance (wall material) in a manner that a predetermined particle size is achieved.

Furthermore, the urethane-based colored resin particle of the present disclosure may include a microcapsule pigment containing a synergist (pigment derivative) together with the pigment described above. The synergist (pigment derivative) to be used is a substance used in a preferred embodiment to make it easier for the pigment to be embedded in the urethane-based resin particle during the formation of the urethane-based colored resin particle and to prevent shedding of the pigment from the urethane-based colored resin particle, is a derivative having a structure similar to that of the pigment, and is a compound exhibiting strong interaction with the pigment. Furthermore, the synergist also exhibits strong interaction with a dispersant described below that is preferably used during production of the urethane-based colored resin particle.

By allowing at least the synergist to be contained in addition to the pigment in the urethane-based colored resin particle, because the synergist has a similar structure (common backbone) as that of the pigment, the synergist is adsorbed on the resin of the urethane-based colored resin particle as well as adsorbed on the pigment, and thus the pigment readily enters the urethane-based resin particle, and the shedding prevention effect is achieved.

Such interaction of the synergist is believed to be van der Waals force, and it is presumed that firm and practical adsorption can be achieved due to the interaction on the entirety of a flat and wide face of the pigment backbone. Note that, typically, a synergist is used as a dispersion aid of a pigment in a liquid medium; however, in the present disclosure, by allowing the synergist to be contained together with the pigment in the urethane-based colored resin particle to be formed, the effect of the present disclosure can be further exhibited.

As the synergist that can be used, a synergist that is appropriate for the pigment to be used can be used. Commercially available products of synergists for the color of the pigment, specifically, for carbon black, for yellow pigments, for azo pigments, and for phthalocyanine pigments can be used. Examples of the commercially available products having acidic functional groups include Solsperse 5000 (phthalocyanine pigment derivative), Solsperse 12000 (phthalocyanine pigment derivative), and Solsperse 22000 (azo pigment derivative) available from The Lubrizol Corporation, BYK-SYNERGIST 2100 (phthalocyanine pigment derivative) and BYK-SYNERGIST 2105 (yellow pigment derivative) available from BYK-Chemie Japan K.K., EFKA 6745 (phthalocyanine pigment derivative) and EFKA 6750 (azo pigment derivative) available from BASF Japan Ltd., and Synergist Yellow-8020, 8404, 9043, 4827 (yellow pigment derivative); Synergist Red-3953, 4327, 4474, 4858, 4966, 5507, 5525, 5909, 6006, 6547 (azo pigment derivative); Synergist Blue-6831, 7215, 7438, 7854, 0785, 0785A (phthalocyanine pigment derivative); and Synergist Violet-6965, 7349, 7572, 7988 (phthalocyanine pigment derivative) available from Disper Material R & D Corp. One of these may be used alone, or two or more of these may be used in combination.

The content of these synergists in the urethane-based colored resin particle is preferably varied based on the pigment type to be used and the used amount thereof. From the perspective of suitably exhibiting blending effect of the synergist and effect of the present disclosure, the pigment and the synergist to be used are preferably contained in a certain blending ratio. The mass ratio of synergist/pigment is preferably 0.01 to 0.2, and more preferably 0.05 to 0.15. By setting the mass ratio of synergist/pigment to 0.01 or greater, the pigment is less likely to be shed from the colored resin particle. Meanwhile, by setting the mass ratio to 0.2 or less, aggregation of the pigment in the urethane-based colored resin particle is suppressed, and deterioration of writing performance is suppressed.

The urethane-based colored resin particle of the present disclosure can be produced by microencapsulating a material containing at least the pigment described above or a material containing at least the pigment and the synergist described above in a manner that a predetermined particle size is achieved.

Examples of the microencapsulation method include interfacial polymerization, interfacial polycondensation, in situ polymerization, in-liquid curing coating, phase separation from an aqueous solution, phase separation from an organic solvent, melt dispersion cooling, air suspension coating, and spray drying.

In the present disclosure, from the perspectives of the ease of production and the possibility of increasing the amount of components to be contained, and based on the reasons of few restrictions on the types of components to be contained and excellent redispersibility, a resin component (shell component) constituting the microcapsule includes a urethane-based resin such as urethane, urea, or urea-urethane.

The urethane (polyurethane resin), urea (polyurea resin), and urea-urethane (polyurea resin/polyurethane resin) used in the formation of the shell layer are formed by reacting an isocyanate component and an amine component, an alcohol component, or the like.

Examples of the isocyanate component that can be used include 2,4-tolylene diisocyanate, 2,6-tolylene diisocyanate, diphenylmethane diisocyanate, polymeric diphenylmethane diisocyanate, hydrogenated diphenylmethane diisocyanate, 1,5-naphthalene diisocyanate, 3,3'-dimethyldiphenyl-4,4'-diisocyanate, hexamethylene diisocyanate, isophorone diisocyanate, m-phenylene diisocyanate, p-phenylene diisocyanate, trans-cyclohexane 1,4-diisocyanate, diphenyl ether diisocyanate, xylylene diisocyanate, hydrogenated xylylene diisocyanate, 2,6-diisocyanate caproic acid, tetramethyl-m-xylylene diisocyanate, tetramethyl-p-xylylene diisocyanate, trimethylhexamethylene diisocyanate, triphenylmethane triisocyanate, tris (isocyanatephenyl) thiophosphate, isocyanate alkyl 2,6-diisocyanate capronate, 1,6,11-undecane triisocyanate, 1,8-diisocyanate-4-isocyanatemethyloctane, 1,3,6-hexamethylene triisocyanate, and bicycloheptane triisocyanate. Furthermore, examples of the isocyanate component include diisocyanates such as m-phenylene diisocyanate, p-phenylene diisocyanate, 2,6-tolylene diisocyanate, 2,4-tolylene diisocyanate, naphthalene-1,4-diisocyanate, diphenylmethane-4,4'-diisocyanate, 3,3'-dimethoxy-4,4-biphenyl-diisocyanate, 3,3'-dimethylphenylmethane-4,4'-diisocyanate, xylylene-1,4-diisocyanate, 4,4'-diphenylpropane diisocyanate, trimethylene diisocyanate, hexamethylene diisocyanate, propylene-1,2-diisocyanate, butylene-1,2-diisocyanate, cyclohexylene-1,2-diisocyanate, and cyclohexylene-1,4-diisocyanate; triisocyanates such as 4,4',4"-triphenylmethane triisocyanate and toluene-2,4,6-triisocyanate; tetraisocyanates such as 4,4'- dimethyldiphenylmethane-2,2',5,5'-tetraisocyanate; and isocyanate prepolymers such as adducts of hexamethylene diisocyanate and trimethylolpropane, adducts of 2,4-tolylene diisocyanate and trimethylolpropane, adducts of xylylene diisocyanate and trimethylolpropane, and adducts of tolylene diisocyanate and hexanetriol. These isocyanate components may be used alone or as a mixture.

Specific examples of the amine component that can be used include aliphatic amines such as ethylene diamine, hexamethylene diamine, diaminocyclohexane, piperazine, diethylenetriamine, triethylenetetramine, tetraethylenepentamine, iminobispropylamine, diaminoethyl ether, 1,4-diaminobutane, pentamethylenediamine, 2-methylpiperazine, 2,5-dimethylpiperazine, 2-hydroxytrimethylenediamine, diethylaminopropylamine, diaminopropylamine, diaminopropane, 2-methylpentamethylenediamine, and xylenediamine; and m-phenylenediamine, triaminobenzene, 3,5-tolylenediamine, diaminodiphenylamine, diaminonaphthalene, t-butyltoluenediamine, diethyltoluenediamine, and diaminophenol. Among these amine components, aromatic amines such as phenylenediamine, diaminophenol, and triaminobenzene are preferable.

Specific examples of the alcohol component that can be used include polyols having two or more hydroxyl groups, such as ethylene glycol, 1,3-propanediol, 1,4-butanediol, 1,5-pentanediol, 1,6-hexanediol, glycerin, catechol, resorcinol, and hydroquinone. These alcohol components may be used alone or as a mixture. Furthermore, the alcohol component and the amine component may be mixed for use.

For the formation of the shell layer from a urethane-based resin of urethane, urea, or urea-urethane, the shell layer can be formed, for example, by 1) performing interfacial polymerization by dispersing a monomer component of at least one of urethane, urea or urethane-urea, and a pigment component, or by 2) a production method including an emulsification step of dispersing an oily component (oily phase) containing an isocyanate component in an aqueous solvent (aqueous phase) to prepare an emulsified liquid, and an interfacial polymerization step of performing interfacial polymerization by adding, to the emulsified liquid, at least one of the amine component or the alcohol component.

In the above production method 2), a solvent can be used in the preparation of the emulsified liquid. For example, phenyl glycol, benzyl alcohol, ethylene glycol monobenzyl ether, ethyl acetate, alkylsulfonic acid phenyl ester, ethylhexyl phthalate, tridecyl phthalate, ethylhexyl trimellitate, diethylene glycol dibenzoate, dipropylene glycol dibenzoate, and a liquid xylene resin can be used. These solvents may be used alone or as a mixture.

On the other hand, a protective colloid may be included, in advance, in the aqueous phase that is used to emulsify the oily phase. A water-soluble polymer can be used as the protective colloid, and can be appropriately selected from among known anionic polymers, nonionic polymers, and amphoteric polymers. Particularly preferably, polyvinyl alcohol, gelatin, and a cellulose polymer compound are contained.

The aqueous phase may also contain a surfactant. The surfactant can be one appropriately selected from among anionic and nonionic surfactants, which do not act on the protective colloid causing precipitation or aggregation. Preferred surfactants may include sodium alkylbenzene sulphonate (e.g., sodium lauryl sulfate), dioctyl sodium sulfosuccinate, and polyalkylene glycol (e.g., polyoxyethylene nonylphenyl ether).

The oily phase made in the manner as described above is added to the aqueous phase, and emulsified using mechanical force. Then, the temperature of the system is increased as necessary, thereby causing interfacial polymerization at the oily droplet interface, so that particles can be formed. In addition, desolvation can be performed at the same time as, or after the end of, the interfacial polymerization reaction. After the interfacial polymerization reaction and desolvation, the particles are separated from the aqueous phase, washed and then dried to obtain capsule particles.

In the present disclosure, through forming a shell layer by the forming method described above, a urethane-based colored resin particle including a microcapsule pigment that contains at least a pigment, or a urethane-based colored resin particle including a microcapsule pigment that contains at least a pigment and a synergist is obtained. In the present disclosure, at least the content of the pigment and the content of the synergist in a case in which a synergist is used vary from the perspective of optionally controlling dispersibility, specific gravity, and particle size and also from the perspective of color development. However, the aqueous phase component (water, PVA) and the oil phase component (solvent) used during the production do not substantially remain when urethane-based colored resin particles are formed. Thus, the urethane-based colored resin particles having these components in the predetermined preferred ranges described above can be obtained through polymerizing the raw materials (such as pigment, synergist, dispersant, and resin component) by adjusting the pigment, the synergist, the dispersant, and the resin component (balance) to be in the preferred ranges.

From the perspectives of coloring strength and dispersion stability, the average particle size of the urethane-based colored resin particles is preferably 0.3 to 2 μm, more preferably 0.5 to 1.5 μm. In the present disclosure (including Examples described below), "average particle size" refers to the value of the particle size (D50) at 50% cumulative volume in the particle size distribution calculated based on the volume measured by a laser diffraction method. Here, the measurement of average particle size by a laser diffraction method can be performed using, for example, a particle size distribution analyzer HRA 9320-X100 which is available from Nikkiso Co., Ltd.

The content of the urethane-based colored resin particle is preferably 3 to 30 mass % (hereinafter, simply referred to as "%"), more preferably 10 to 30%, relative to the total amount of the ink composition. When the content of the urethane-based colored resin particle is less than 3%, a preferred drawing line concentration is not obtained; meanwhile, when the content of the urethane-based colored resin particle is greater than 30%, writing touch may be heavier, or drawing lines may be streaky, which are not preferable.

The naphthalenesulfonic acid-formaldehyde condensate used in the present disclosure is contained for exhibiting the effects of the present disclosure. Examples of the naphthalenesulfonic acid-formaldehyde condensate that can be used include at least one of the commercially available products such as Demol N, Demol RN, Demol RN-L, Demol T, Demol T-45 (all these are sodium salts of β-naphthalenesulfonic acid-formaldehyde condensate available from Kao Corporation), Cellflow 110P (naphthalenesulfonic acid-formaldehyde condensate available from DKS Co., Ltd.), Polefine 510-AN (alkylnaphthalenesulfonic acid-formaldehyde condensate available from Takemoto Oil & Fat Co., Ltd.), Flowric PS (alkylnaphthalenesulfonic acid-formaldehyde condensate available from Flowric Co., Ltd.), or Tamol NN9401 (sodium salt of naphthalenesulfonic acid-formaldehyde condensate available from BASF).

The naphthalenesulfonic acid-formaldehyde condensates include the acid type and the salt type such as an alkali metal, ammonium, and an organic amine; either can be used.

The content of the naphthalenesulfonic acid-formaldehyde condensate is preferably 0.04 to 5.5%, more preferably 0.05 to 5%, and particularly preferably 0. 3 to 3%, relative to the total amount of the ink composition.

When the content of the naphthalenesulfonic acid-formaldehyde condensate is less than 0.05%, the effects of the present disclosure may not be exhibited; meanwhile, when the content of the naphthalenesulfonic acid-formaldehyde condensate exceeds 5%, the stability of the ink over time may deteriorate.

<Ink Composition for Water-Based Ballpoint Pen>

The ink composition for a water-based ballpoint pen of the present disclosure contains at least the urethane-based colored resin particle having an average particle size of 0.3 to 2 μm and a naphthalenesulfonic acid-formaldehyde condensate; additionally, the ink composition for a water-based ballpoint pen of the present disclosure may contain a water-soluble solvent, and may contain, as necessary, a conventional colorant besides the urethane-based colored resin particle.

Examples of the water-soluble solvent that can be used include glycols such as ethylene glycol, diethylene glycol, triethylene glycol, propylene glycol, polyethylene glycol, 3-butylene glycol, thiodiethylene glycol, and glycerin; ethylene glycol monomethyl ether, and diethylene glycol monomethyl ether. These solvents may be used alone or as a mixture. The amount of the water-soluble solvent is preferably 5 to 40% relative to the ink composition total amount.

For the colorant that can be used, a water-soluble dye can be used as necessary in an appropriate amount, or a pigment, such as an inorganic pigment or an organic pigment, can be used as necessary in an appropriate amount within a range in which the effects of the present disclosure would not be impaired.

For the water-soluble dye, a direct dye, an acid dye, an edible dye, or a basic dye can be used in an appropriate amount within a range in which the effects of the present disclosure would not be impaired.

The ink composition for a water-based ballpoint pen of the present disclosure contains at least the urethane-based colored resin particle having an average particle size of 0.3 to 2 μm and a naphthalenesulfonic acid-formaldehyde condensate. In addition to the colorant besides the colored resin particle and the water-soluble solvent, the ink composition for a water-based ballpoint pen of the present disclosure may appropriately contain, as the balance, water as a solvent (e.g., tap water, purified water, distilled water, ion exchanged water, or purified water), and in addition thereto, a dispersant, a lubricant, a thickener, a pH adjuster, a corrosion inhibitor, a preservative or an antibacterial agent, or the like, within a range in which the effects of the present disclosure would not be impaired.

Examples of the dispersant that can be used include nonionic and anionic surfactants, and water-soluble resins. Preferably, water-soluble polymers are used.

Examples of the lubricant that can be used include nonionic types such as fatty acid esters of polyhydric alcohols, higher fatty acid esters of sugars, polyoxyalkylene higher fatty acid esters, and alkyl phosphate esters; anionic types such as phosphate, alkyl sulfonates of higher fatty acid amides, and alkyl allyl sulfonates; derivatives of polyalkylene glycols, and polyether modified silicones, which are also used as surface treating agents for pigments.

As the thickener that can be used, for example, at least one selected from the group consisting of synthetic polymers, cellulose, and polysaccharides is preferred. Specific examples thereof include arabic gum, tragacanth gum, guar gum, locust bean gum, alginic acid, carrageenan, gelatin, xanthan gum, welan gum, succinoglycan, diutan gum, dextran, methyl cellulose, ethyl cellulose, hydroxyethyl cellulose, carboxymethyl cellulose, starch glycolic acid and salts thereof, polyvinylpyrrolidone, polyvinyl methyl ether, polyacrylic acid and salts thereof, polyethylene oxide, copolymers of vinyl acetate and polyvinylpyrrolidone, and styrene-acrylic acid copolymers and salts thereof.

Examples of the pH adjuster include ammonia, urea, monoethanolamine, diethanolamine, triethanolamine, alkali metal salts of carbonic acid and phosphoric acid such as sodium tripolyphosphate and sodium carbonate, and alkali metal hydroxides such as sodium hydroxide. Furthermore, examples of the corrosion inhibitor include benzotriazole, tolyltriazole, dicyclohexylammonium nitrite, and saponins. Examples of the preservative or antibacterial agent include phenol, omadine sodium, sodium benzoate, thiazoline-based compounds, and benzimidazole compounds.

For the components, such as the dispersant, the lubricant, the thickener, the pH adjuster, the corrosion inhibitor, the preservative, or the antibacterial agent, one type may be used alone, or a combination of two or more types of these may be used. Commercially available products of these, if present, can be used.

The ink composition for a water-based ballpoint pen of the present disclosure can be prepared by appropriately combining at least the urethane-based colored resin particle having an average particle size of 0.3 to 2 μm, a naphthalenesulfonic acid-formaldehyde condensate, a water-soluble solvent, and other components depending on the application of the ink for a ballpoint pen, stirring and mixing the combined components using a stirrer such as a homomixer, a homogenizer, or a disperser, and optionally, filtering or centrifuging the mixture to remove coarse particles present in the ink composition.

The ink composition for aqueous ballpoint pens of the present disclosure can be produced by production methods of other aqueous ink compositions without a particular difference.

That is, the ink composition for a water-based ballpoint pen of the present disclosure can be produced by mixing and stirring at least the urethane-based colored resin particle having an average particle size of 0.3 to 2 μm, a naphthalenesulfonic acid-formaldehyde condensate, a water-soluble solvent, and other components using a mixer or the like, and further, for example, using a device that can apply strong shearing such as a bead mill, a homomixer, a homogenizer, with the stirring conditions set to suitable conditions.

In addition, a pH level (at 25° C.) of the ink composition for aqueous ballpoint pens of the present disclosure is adjusted to preferably 5 to 10, more preferably 6 to 9.5, by using a pH adjuster or the like from the perspective of usability, safety, stability of the ink itself, and matching with the ink container.

The ink composition for aqueous ballpoint pens of the present disclosure is used in a ballpoint pen provided with a pen tip portion such as a ballpoint pen tip.

The aqueous ballpoint pen of the present disclosure includes a ballpoint pen where the ink composition for aqueous ballpoint pens having the above-mentioned composition is accommodated in an ink container (refill) for ballpoint pens having a ball with a diameter of 0.18 to 2.0 mm. In addition, as an ink follower, a material that is not compatible with the aqueous ink composition and has a smaller specific gravity than the aqueous ink composition, for example, polybutene, silicone oil, or mineral oil can be accommodated in the ink container. As long as a ball having the diameter in the range described above is included, the structure of the water-based ballpoint pen to be used is not limited. In particular, a water-based ballpoint pen having a refill with the water-based ink composition filled in an ink container, which is a polypropylene tube, and with a stainless steel tip set at the tip (with the ball being made of cemented carbide) is preferred.

Furthermore, the ballpoint pen may be a direct type ballpoint pen having a collector structure (ink retention mechanism) in which a shaft cylinder itself is filled with the ink composition for aqueous ballpoint pens having the composition described above as an ink container.

The ink composition for a water-based ballpoint pen of the present disclosure configured as described above contains at least the urethane-based colored resin particle and a naphthalenesulfonic acid-formaldehyde condensate, the urethane-based colored resin particle having an average particle size of 0.3 to 2 μm and containing a pigment; as such, in a case of writing at a high writing angle or under a high load, the dispersed state of the urethane-based colored resin particle containing a pigment interposed between the ball and the ball socket is improved, and the rotation of the ball is not prevented, making it possible to provide an ink composition for a water-based ballpoint pen in which the phenomenon of skipped strokes does not occur, writing defects are less likely to occur, and the quality of strokes is excellent.

EXAMPLES

Next, the present disclosure will be described in more detail using Production Examples 1 and 2 of the urethane-based colored resin particles to be used as well as Examples 1 to 6 and Comparative Examples 1 and 2 of the ink compositions for a water-based ballpoint pen; however, the present disclosure is not limited to the following Examples. Furthermore, the average particle size (D50: μm) of the colored resin particles obtained in Production Examples 1 and 2 were measured by using a particle size distribution analyzer HRA 9320-X100, available from Nikkiso Co., Ltd.

Production Example 1: Production of Urethane-Based Colored Resin Particle A

As an oil phase solution, while 11.6 parts of ethylene glycol monobenzyl ether and 1.8 parts of dispersant (DISPERBYK-111, available from BYK-Chemie Japan K.K.) were heated to 60° C., 2.0 parts of a pigment (carbon black, Cabot Mogul L, available from Cabot Corporation) and 0.2 parts of a synergist (phthalocyanine pigment derivative, Solsperse 5000, available from The Lubrizol Corporation) were added and adequately dispersed. Next, 9.0 parts by mass of a trimethylolpropane adduct of xylylene diisocyanate (TAKENATE D110N, available from Mitsui Chemicals, Inc.) as a prepolymer was added, and an oil phase solution was prepared. As an aqueous phase solution, while heating 600 parts by mass of distilled water to 60° C., 15 parts by mass of polyvinyl alcohol (PVA-205, available from Kuraray Co., Ltd.) as a dispersant was dissolved in the distilled water, and thus an aqueous phase solution was prepared.

The oil phase solution was added to the water phase solution at 60° C., and stirred with a homogenizer for 6 hours for emulsion polymerization, thus completing polymerization. By subjecting the obtained dispersion to centrifugation, colored resin particles A were obtained. The average particle size (D50) of the colored resin particles A was 1.3 μm.

Production Example 2: Production of Urethane-Based Colored Resin Particle B

Urethane-based colored resin particles B were obtained in the same manner as in Production Example 1 described above except that the pigment in Production Example 1 was replaced with 2.0 parts of PV Fast Blue L6472 (available from Clariant Japan) and that the dispersant was replaced with 1.0 part of TEGO Dispers 685 (available from Evonik Japan).

The average particle size (D50) of the colored resin particles B was 1.9 μm.

Examples 1 to 6 and Comparative Examples 1 and 2 Each of the ink compositions for a water-based ballpoint pen was prepared using the urethane-based colored resin particles A and B of the Production Examples 1 and 2 described above and in accordance with the blending compositions listed in Table 1 below by an ordinary method.

The quality of strokes of the ink compositions for a water-based ballpoint pen obtained in Examples 1 to 6 and Comparative Examples 1 and 2 described above was evaluated using the following evaluation method.

These results are shown in Table 1 below.
Evaluation Method of Quality of Strokes A ballpoint pen (UM-100 available from Mitsubishi Pencil, the ball diameter being 0.5 mm) filled with each of the ink compositions obtained in the Examples and Comparative Examples described above was subjected to writing in a mechanical writing test under the following writing conditions. Evaluation was performed in accordance with the following evaluation criteria.

Writing conditions: 150 gf, a writing angle of 80 degrees, a writing speed of 4.5 ram/min, and 25° C.
Evaluation Criteria:

A: No skipped strokes were observed.

B: There were from 1 to less than 3 spots of skipped strokes.

C: There were from 3 to less than 5 spots of skipped strokes.

D: There were 5 or more spots of skipped strokes.

TABLE 1

| | | | Examples | | | | | | Comparative Examples | |
|---|---|---|---|---|---|---|---|---|---|---|
| | | | 1 | 2 | 3 | 4 | 5 | 6 | 1 | 2 |
| Colorant | Colored resin particle A | Production Example 1 | 12 | | 15 | | 12 | | 12 | |
| | Colored resin particle B | Production Example 2 | | 20 | | 18 | | 17 | | 20 |

TABLE 1-continued

| | | | Examples | | | | | | Comparative Examples | |
|---|---|---|---|---|---|---|---|---|---|---|
| | | | 1 | 2 | 3 | 4 | 5 | 6 | 1 | 2 |
| Naphthalenesulfonic acid-formaldehyde condensate | p-Naphthalenesulfonic acid-formaldehyde | Demol N (available from Kao Corporation) | 0.6 | 1.2 | 0.05 | 5 | 0.04 | 5.5 | | |
| Thickener | Xanthan gum | KELZAN S (available from Sansho Co., Ltd.) | 0.3 | 0.3 | 0.3 | 0.3 | 0.3 | 0.3 | 0.3 | 0.3 |
| pH Modifier | Triethanolamine | | 0.1 | 0.1 | 0.1 | 0.1 | 0.1 | 0.1 | 0.1 | 0.1 |
| Corrosion inhibitor | Benzotriazol | | 0.3 | 0.3 | 0.3 | 0.3 | 0.3 | 0.3 | 0.3 | 0.3 |
| Preservative | Benzisothiazoline | BIODEN 421 (available from Daiwa Chemical Industry Co., Ltd.) | 0.3 | 0.3 | 0.3 | 0.3 | 0.3 | 0.3 | 0.3 | 0.3 |
| Lubricant | Phosphate | RD-510Y (available from Toho Chemical Industry Co., Ltd.) | 0.3 | 0.3 | 0.3 | 0.3 | 0.3 | 0.3 | 0.3 | 0.3 |
| Organic solvent | Glycerin | | 10 | 10 | 10 | 10 | 10 | 10 | 10 | 10 |
| Water | Distilled water | | 76.1 | 67.5 | 73.65 | 65.7 | 76.66 | 66.2 | 76.7 | 68.7 |
| Evaluation: Quality of strokes | | | A | A | A | A | B | B | D | C |

As is clear from the results in Table 1 above, it was confirmed that, when the ink compositions for a water-based ballpoint pen of Examples 1 to 6, which fall within the scope of the present disclosure, is compared to Comparative Examples 1 and 2, which are outside the scope of the present disclosure, the phenomenon of skipped strokes or writing defects is less likely to occur even in a case of writing at a high angle or under a high load.

INDUSTRIAL APPLICABILITY

An ink composition suitable for water-based ballpoint pens is provided.

The invention claimed is:

1. A ballpoint pen comprising an ink composition, the ink composition comprising:
    a urethane-based colored resin particle; and
    a naphthalenesulfonic acid-formaldehyde condensate,
    wherein the urethane-based colored resin particle comprises carbon black and a synergist in a mass ratio of the synergist/the carbon black in a range of from 0.01 to 0.2,
    wherein the urethane-based colored resin particle has an average particle size in a range of from 0.5 to 2 μm, and
    wherein the naphthalenesulfonic acid-formaldehyde condensate is present in a range of 0.04 to 5.5 mass % relative to the total amount of the ink composition.

2. The ballpoint pen of claim 1, wherein the ink composition is accommodated in an ink container configured for the ballpoint pen, and wherein the ballpoint pen has a ball with a diameter in a range of from 0.18 to 2.0 mm.

3. The ballpoint pen of claim 1, wherein the naphthalenesulfonic acid-formaldehyde condensate is present in a range of from 0.05 to 5 mass %, relative to a total ink composition mass.

4. The ballpoint pen of claim 1, wherein the carbon black is present in the urethane-based colored resin particle in a range of from 5 to 40 mass %, based on a total urethane-based colored resin particle mass.

5. The ballpoint pen of claim 1, wherein the carbon black is present in the urethane-based colored resin particle in a range of from 10 to 35 mass %, based on a total urethane-based colored resin particle mass.

6. The ballpoint pen of claim 1, wherein the carbon black is present in the urethane-based colored resin particle in a range of from 12 to 25 mass %, based on a total urethane-based colored resin particle mass.

7. The ballpoint pen of claim 1, wherein the naphthalenesulfonic acid-formaldehyde condensate is present in a range of from 0.3 to 3 mass %, relative to a total ink composition mass.

8. The ballpoint pen of claim 1, wherein the urethane-based colored resin particle does not substantially comprise an aqueous phase component and an oil phase component used during production when the urethane-based colored resin particles are formed.

9. The ballpoint pen of claim 1, wherein the urethane-based colored resin particle has an average particle size in a range of from 1.3 to 2 μm.

* * * * *